(No Model.)
B. B. WARING.
AUTOMATIC CHECK.
No. 580,439. Patented Apr. 13, 1897.
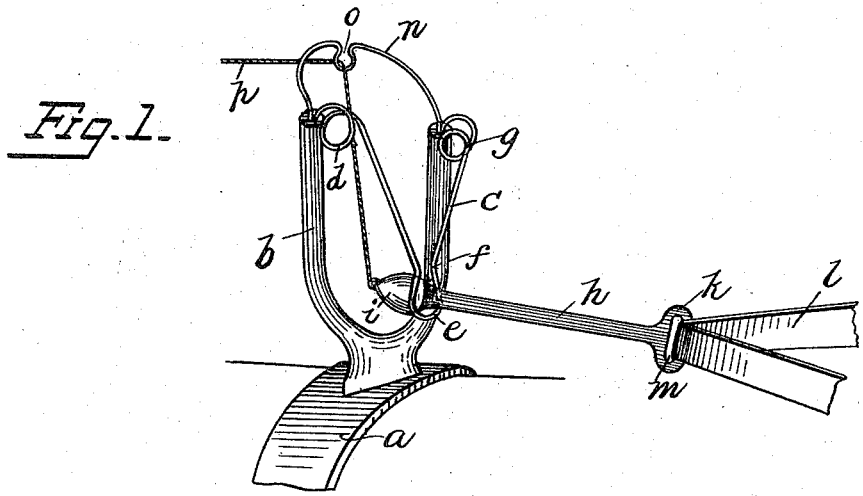
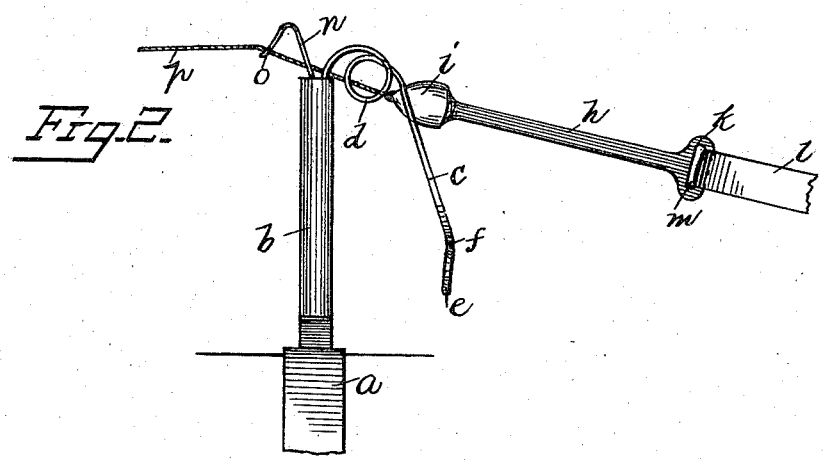
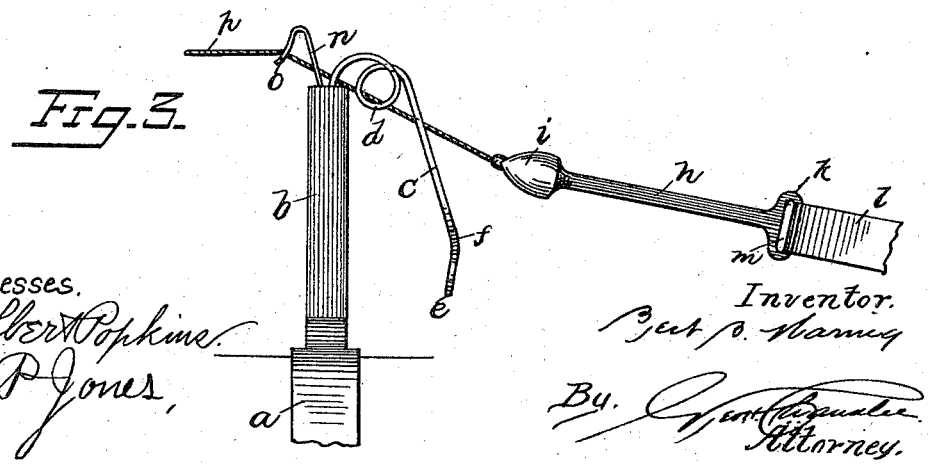
Witnesses.
Albert Popkins
C. P. Jones
Inventor.
Bert B. Waring
By
Attorney.

UNITED STATES PATENT OFFICE.

BERT B. WARING, OF ALBION, IOWA.

AUTOMATIC CHECK.

SPECIFICATION forming part of Letters Patent No. 580,439, dated April 13, 1897.

Application filed August 4, 1896. Serial No. 601,667. (No model.)

*To all whom it may concern:*

Be it known that I, BERT B. WARING, a citizen of the United States, residing at Albion, in the county of Marshall, State of Iowa, have invented certain new and useful Improvements in Automatic Checks; and I do hereby declare the following to be a full, clear, and exact description of the invention, such as will enable others skilled in the art to which it appertains to make and use the same.

My invention relates to harness and checking and unchecking devices for horses, and has for its object to provide a construction of this nature which may be applied to harness and may be operated to check or uncheck the horse without necessitating leaving the carriage or other vehicle to which the horse is attached.

In the drawings forming part of the specification, and in which like letters of reference indicate similar parts in the several views, Figure 1 is a perspective view showing the device applied to the saddle of the harness of a horse, also the arrangement of the checkrein and operating-cord relative thereto. In this view the animal is supposed to be "reined up." Fig. 2 is a side view showing the relative positions of the several elements of my device when the operating-cord is manipulated to disengage the bolt from the keeper; and Fig. 3 is a view similar to Fig. 2, showing the relative positions of the bolt and keeper when the horse is unchecked.

Referring now to the drawings, in constructing a device in accordance with my invention I affix to the saddle $a$ of the harness a yoke $b$, at the upper ends of whose arms are affixed the ends of a spring-wire $c$, which wire, beginning at one arm, is bent downwardly and upwardly in the form of a loop $d$, then downwardly and outwardly, and then upwardly to form a projection $e$, having a narrowed portion $f$. The wire is then formed in a second loop $g$ and is then affixed to the second arm of the loop.

A bolt $h$, having an enlarged head $i$, has passed through its opposite end $k$ the checkrein $l$ of the harness, an opening $m$ being formed in the said end $k$ for this purpose.

Extending rearwardly from the loop $b$ is a wire or other form of guide $n$, which, beginning with one arm of the loop, passes backwardly and, forming a loop, is then brought to the other arm. Passed through the loop $o$ in the wire $n$ is an operating-cord $p$, which is attached to the head $i$ of the bolt $h$, whereby when said cord is pulled the bolt may be drawn rearwardly until its head passes within the wire keeper above mentioned, when upon releasing the cord the bolt will drop down and the contracted portion $f$ of the keeper will prevent withdrawal of the bolt. It will be readily understood that during this operation the checkrein $l$ is fixed to the bit of the horse, and thus the animal forms a support for the checkrein at the time, thus enabling the manipulation of the device.

The animal being now checked or reined up and it being desired to uncheck, the cord $p$ is drawn rearwardly, when the bolt $h$ is pulled upwardly to the position shown in Fig. 2, when upon releasing the driving-lines and at the same time gradually allowing the cord $p$ to slip through the fingers the horse will draw on the checkrein and pull the bolt in the position shown in Fig. 3.

To check the horse, the reins and cord are again pulled and the bolt is seated in the keeper.

It will be readily understood that I may use any desired construction of keeper, it being desirable, however, that the latter have spring action in order to make the check easier on the horse; also that I may use any desired form or arrangement of guide for the cord $p$ without departing in any way from the spirit of my invention.

Having now described my invention and its method of operation, what I claim is—

1. A device of the class described comprising a yoke, a spring-keeper carried thereby, a bolt adapted for engagement with a checkrein and arranged to be held by the keeper and means for releasing the bolt from the keeper.

2. In a device of the class described comprising a yoke, a spring-keeper secured thereto, a bolt adapted for engagement with the keeper and to receive the checkrein, a guide on the yoke, and a cord passing through said guide to the bolt whereby the latter may be engaged or disengaged with respect to the keeper.

3. A device of the class described comprising a yoke, a spring-keeper secured to the yoke and having a narrowed portion, a bolt having a head adapted to be engaged by the keeper, said bolt also being arranged to receive a checkrein, a guide secured to the yoke and extending rearwardly thereof and a cord passed through the said guide and attached to the bolt whereby the latter may be engaged or disengaged with respect to the keeper.

In testimony whereof I affix my signature in presence of two witnesses.

BERT B. WARING.

Witnesses:
J. B. MASTERSON,
CHAS. S. BURGER.